(12) United States Patent
Schmidt et al.

(10) Patent No.: US 9,297,965 B2
(45) Date of Patent: Mar. 29, 2016

(54) PLUG-IN CONNECTION SYSTEM FOR PLUG-IN CONNECTORS

(71) Applicant: Harting Electronics GmbH, Espelkamp (DE)

(72) Inventors: Hartmuth Schmidt, Ostercappeln (DE); Martin Lueckemeier, Rahden (DE)

(73) Assignee: HARTING ELECTRONICS GMBH, Espelkamp (DE)

( * ) Notice: Subject to any disclaimer, the term of this patent is extended or adjusted under 35 U.S.C. 154(b) by 0 days.

(21) Appl. No.: 14/374,693

(22) PCT Filed: Nov. 23, 2012

(86) PCT No.: PCT/DE2012/100358
§ 371 (c)(1),
(2) Date: Jul. 25, 2014

(87) PCT Pub. No.: WO2013/110251
PCT Pub. Date: Aug. 1, 2013

(65) Prior Publication Data
US 2015/0016779 A1    Jan. 15, 2015

(30) Foreign Application Priority Data

Jan. 25, 2012   (DE) .......................... 10 2012 100 615

(51) Int. Cl.
*G02B 6/38* (2006.01)
*H01R 13/627* (2006.01)
*H01R 13/633* (2006.01)

(52) U.S. Cl.
CPC .............. *G02B 6/3893* (2013.01); *G02B 6/389* (2013.01); *H01R 13/6275* (2013.01); *H01R 13/6277* (2013.01); *G02B 6/3807* (2013.01); *H01R 13/6271* (2013.01); *H01R 13/633* (2013.01)

(58) Field of Classification Search
None
See application file for complete search history.

(56) References Cited

U.S. PATENT DOCUMENTS 3,714,843 A * 2/1973 Bracey .................. B23Q 16/04
74/527
4,208,082 A * 6/1980 Davies ............... H01R 13/6277
439/155

(Continued)

FOREIGN PATENT DOCUMENTS

DE         20300326        5/2004
DE       202006005177      6/2006

(Continued)

OTHER PUBLICATIONS

English translation of international preliminary report on patentability for PCT/DE2012/100358, original report dated Jun. 4, 2014.*

*Primary Examiner* — Mike Stahl
(74) *Attorney, Agent, or Firm* — Jacobson Holman, PLLC

(57) ABSTRACT

A plug-in connection system for a two-piece plug-in connection, comprising a plug-in connector and a matching mating connector, wherein the plug-in connector includes a latching unit with latching hooks provided thereon, which engage in groove areas on the mating connector. Here, a plurality of groove areas is circumferentially provided on the mating connector implemented in a sleeve-type way, which are offset relative to each other by a certain distance ds in relation to the plug-in edge of the mating connector. In the case of groove areas which are arranged in multiple pairs on the external side of the plug-in sleeve, only one latching hook pair engages at any one time during the plug-in operation into a latching groove in the groove area, whereas the other latching hooks respectively remain on a sawtooth flank before or after the one occupied latching groove.

Thus, a very sensitive slide-on latching up to the mutual stop of any desired contacts becomes possible and a complex reception of the contacts is no longer necessary.

Unlatching is carried out by lifting the latching hooks engaging in the latching grooves while withdrawing the external sleeve of the plug-in connector out of the latching grooves by means of opening hooks.

5 Claims, 4 Drawing Sheets

(56) References Cited

U.S. PATENT DOCUMENTS

| | | | |
|---|---|---|---|
| 2002/0176671 A1* | 11/2002 | Tourne | G02B 6/00 385/88 |
| 2004/0198089 A1 | 10/2004 | Turck et al. | |
| 2004/0209509 A1* | 10/2004 | Okamura | H01R 13/6277 439/357 |
| 2007/0232116 A1 | 10/2007 | Bernat et al. | |
| 2009/0130887 A1 | 5/2009 | Guilbert et al. | |
| 2009/0264003 A1 | 10/2009 | Hertzler et al. | |
| 2010/0105235 A1 | 4/2010 | Friedrich et al. | |
| 2010/0220959 A1 | 9/2010 | Hoffmann et al. | |

FOREIGN PATENT DOCUMENTS

| | | |
|---|---|---|
| DE | 102007009947 | 9/2008 |
| DE | 102009011388 | 8/2010 |
| EP | 2037543 | 3/2009 |

* cited by examiner

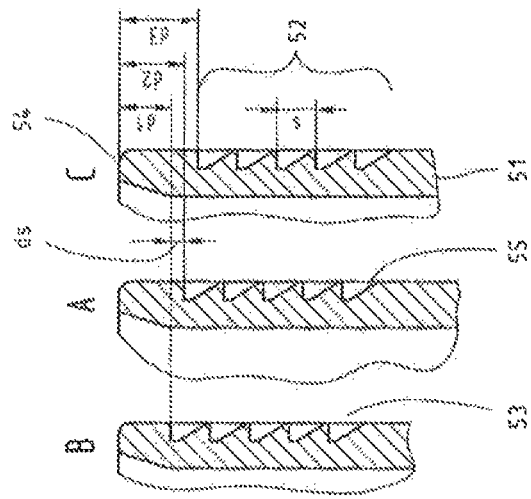
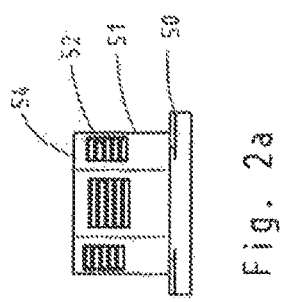
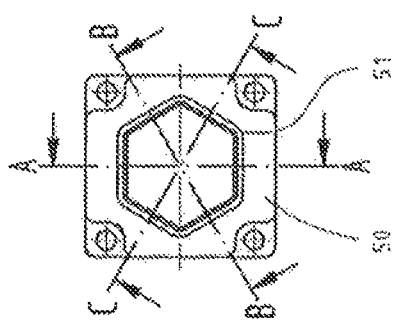
Fig. 2a
Fig. 2b
Fig. 2c

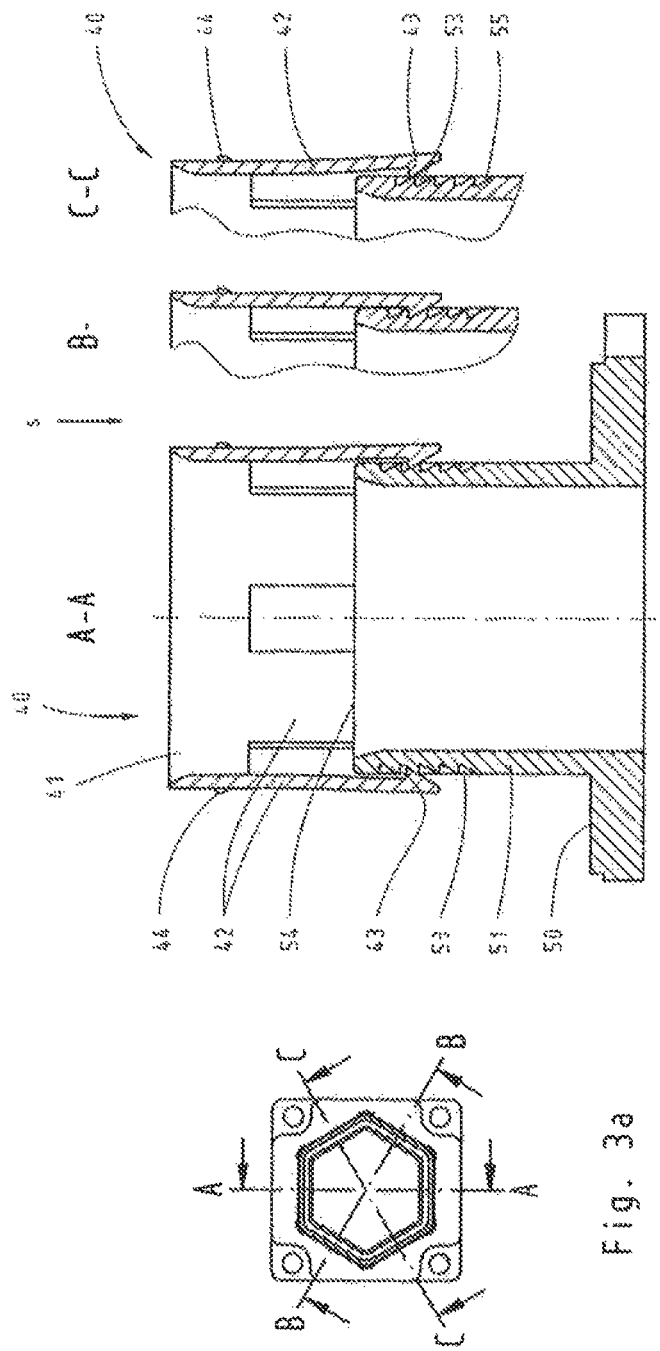

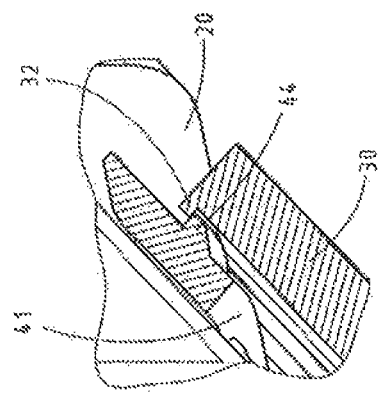
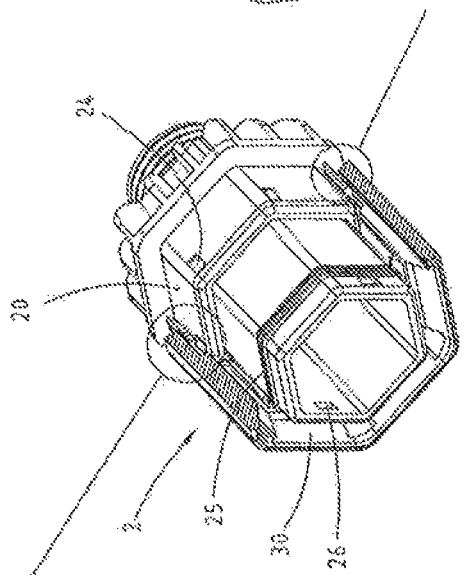
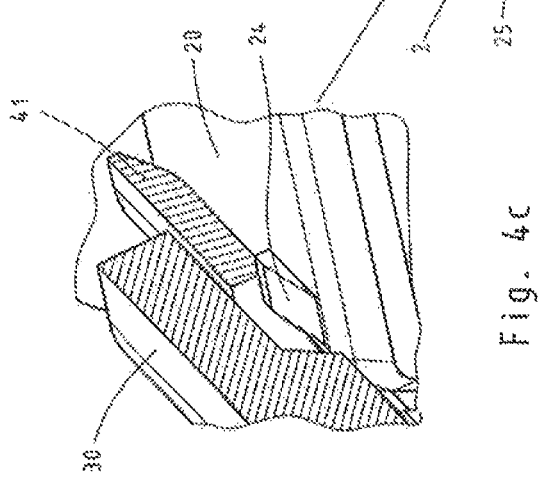

PLUG-IN CONNECTION SYSTEM FOR PLUG-IN CONNECTORS

DESCRIPTION

The invention relates to a plug-in connection system according to the preamble of independent claim 1.

A plug-in connection system of this kind is necessary in order to plug a plug-in connection, in particular in the case of fibre-optical cables, together in an intended manner, in order to achieve an optimal signal transmission, without a complex spring design being necessary, and in order to connect fibre-optical cable plug-in systems having different dimensions with each other.

PRIOR ART

A plug-in connector for fibre-optical cables, in particular for contacting opto-electric converters, is known from DE 10 2009 011 388 B3, wherein separately spring-loaded ferrules are respectively provided in one ferrule housing each, which in turn are mounted in a sliding housing to which a further compression spring is applied, so as to be able to compensate for manufacturing-related dimensional tolerances in the case of different insertion depths between ferrule housings and opto-electrical converters.

From DE 20 2006 005 177 U1, a plug-in connector is known which includes a locking hook that is latched into an integrally moulded recess of the mating connector. A latching plate, on which the locking hook is provided, can be lifted by withdrawing a sleeve, as a result of which the locking hook is released from the recess.

From DE 203 00 326 U1 a connector is known which can engage, by means of beads, into a threaded section of threads of a mating connector. The beads are here formed so as to correspond to the shape of the threads.

From DE 10 2007 009 947 A1 a connector element is known which engages, by means of a thread engagement portion, into the threads of a mating plug-in connector. The engagement of the thread engagement portion may be enabled or blocked by means of an actuating sleeve, wherein the actuating sleeve enables or blocks thread engagement protrusions that are integrally moulded onto the thread engagement portion.

What is of disadvantage here is that systems of a complex design are required in order to design, as intended, plug-in connections for fibre-optical cables, which are at least sealed against the environment, wherein different mechanical dimensions of fibre-optical cable components have to be connected together and wherein a shortening or an extension of the conductor within the plug-in connector housing has to be realised.

OBJECT

The invention is therefore based on the object o forming a plug-in connection that allows contacting in a simple manner, wherein the different structural design conditions of the contacting systems have to be bridged, and which at the some time offers a compact size.

This object is achieved by the characterising part of independent claim 1.

Advantageous embodiments of the invention are provided in the dependent claims.

The invention relates to a plug-in connection of two plug-in connectors, in particular a plug-in connector and a mating connector, which is here provided for being mounted to a housing, and therefore has a special form with a screw-on flange.

The contacts contained within the plug-in connector, here fibre-optical cable ferrules, are suspended in such a way that manufacturing tolerances and slightly different dimensions of ferrules coming from different manufacturers are compensated. However, according to the invention the type of contacts is not just limited to fibre-optical cable ferrules, and for this reason the latter can in principle be replaced with almost any other type of contacts.

The advantages achieved by the invention consist in particular in the fact that this plug-in connection, due to the formation of the mechanical interaction of the two plug-in connectors, includes a soft plug-in mechanism that allows successive contacting of electrical and optical connections.

Another advantage is that by means of the plug-in operation following an initial mating phase of the two plug-in connectors, an immediate latching of the plug-in connection occurs. This is advantageously achieved by means of a latching mechanism, wherein latching hooks on one plug-in connector latch into corresponding latching groove areas of the other plug-in connector.

In order to achieve a very fine resolution for this latching connection, a plurality of fingers with attached latching hooks are provided within the first plug-in connector on a latch ring, whereas a plurality of latching groove areas are provided on the second plug-in connector, into which the latching hooks can latch during the plug-in operation. The latching grooves are provided on the plug-in connector in such a way that the latching hooks will access them in a pairwise manner and whilst being opposite each other, and in that a plurality of latching grooves is circumferentially provided on this plug-in connector, and each of the latching groove pairs has a defined offset relative to the other one(s) of the latching groove pair(s). Thus it is ensured that always just one latching hook pair will completely engage in a latching groove pair, whereas the other latching hook pairs will only partially rest on the tooth flanks of the corresponding latching grooves.

As a result of this circumferentially alternating latching, a very advantageous and fine resolution during an axial sliding movement of the two plug-in connectors relative to each other becomes possible.

This is advantageous in particular in the case of plug-in connectors which contact optical plug-in connections, because it has to he ensured here that, in particular if different makes with different dimensions are being combined, an optimal mutual contacting of the optical coupling surfaces is achieved.

As a result of the novel latching mechanism of the plug-in connection system according to the invention, a spring-loaded system of a complex design as already known from the prior art for accommodating the contact elements is no longer necessary.

Preferably, the plug-in connection is implemented in a hexagonal shape, so that different plug-in systems can be inserted in a simple manner by means of a contact sleeve to be inserted therein, and at the same time in a torsionally secure manner.

Irrespective of this, however, any other prudent shaping from an angled via a polygonal up to a circular cross-sectional shape is conceivable for this type of releasable latching condition.

Further there is the possibility of producing the fingers with the latching hooks of the latch ring in a pairwise manner with graded lengths, which will then engage with latching groove areas evenly provided on the mating connector from the plug-in edge.

EMBODIMENT EXAMPLE

An embodiment example of the invention is shown in the drawings and will be explained in more detail below, wherein:

FIG. 2 shows a detailed sectional view of the functioning mode of the plug-in connector latching;

FIG. 3 shows a detailed sectional view of the latching areas of the plug-in connection; and FIG. 4 shows a detailed, spatial part-sectional view of a plug-in connector.

Figure 1:
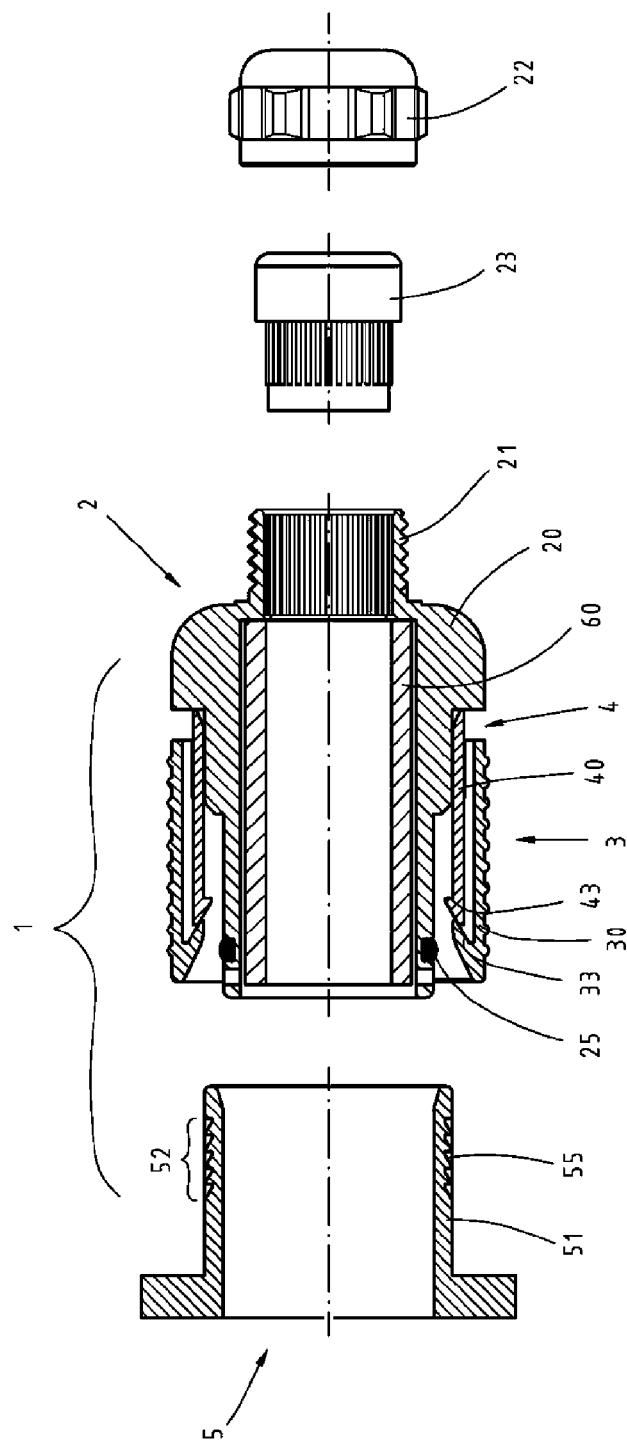
FIG. 1 shows an exploded sectional view of a plug-in connection.

In FIG. 1, a plug-in connection 1 is shown in an exploded sectional view, which plug-in connection 1 is formed from a plug-in connector 2 and a mating connector 5, wherein the plug-in connector 2 comprises a connector body 20, a latch ring 40 and a sliding ring 30 as well as a cable screw mechanism 21. The cable screw connection is completed by a pressure screw 22 which has a sealing insert 23 for sealing against the environment.

Further, a sleeve insert 60 is provided, in which contact elements are used which are not shown herein in any more detail.

The latch ring 40 is pushed onto the connector body 20 in a latching manner either as a separate part by means of several latching hooks 24 or it is integrally connected to the connector body.

The latch ring 40 is formed from a ring 41, onto which a plurality of axially aligned fingers 42 are moulded, the free ends of which in turn have latching hooks 43 acting into the centre thereof.

Above the latch ring 40, an external sleeve 3, which can be slided in sections as a sliding ring 30, is provided in a captive manner on the connector body 20.

On the plug-in side, the sliding ring 30 has a plurality of inwardly acting opening hooks 33, by means of which the latching of the plug-in connection can be released. In the course of this, as the sliding ring 30 is being withdrawn, the opening hooks 33 that are integrally moulded on the plug-in side engage under the latching hooks 43 of the fingers 42 of the latching ring 40 and lever them out of the latching grooves 53, so that the plug-in connector 2 can be withdrawn from the plug-in sleeve 51.

Further, an O-ring 25 is provided on the plug-in side of the connector body 20, recessed in a groove, for sealing the plug-in contacts on the inside of the connector sleeve 51 and of the connector body 20.

Further, the sectional view shows the mating connector 5, which is here formed as a flange housing so as to be screwed onto larger housings or the like.

However, what is also contemplated as a mating connector is a form of plug which as a cable connection is similar to the plug-in connector 1 shown.

FIGS. 2a, 2b, 2c show details of the functioning mode of the latching mechanism of the plug-in connector.

In this context, three pairs of identical fingers 42 are provided on the latch ring 40, which are spread over an hexagonal structure of the plug-in sleeve 51, wherein latching groove areas 52 are provided on each of the sides of the mating connector which is here formed as a flange housing 50. In the top view of FIG. 2b, the surface pairs A-A, B-B and C-C are shown, which in the assembled state form the hexagonal plug-in sleeve 51.

In FIG. 2c, portions of several latching groove areas of the plug-in sleeve 51, identified with A, B, C, are shown, which merely a pair half of the groove areas shown.

What is of interest here is the gradation of the latching grooves relative to each other, which are here identified with D1, D2, D3, and the respective distance of the first latching groove of a latching groove area, here B, A, C, from the plug-in edge 54 of the plug-in sleeve 51.

The distance between d1 and d2 as well as d2 and d3 is here identified with ds and ultimately constitutes the effective and thus smallest latching distance when sliding the plug-in connector on the plug-in sleeve of the mating connector.

The effects of these gradations are shown in more detail in FIGS. 3a, 3b. Here, part of the latch ring 40 of the plug-in connector 2 is shown, together with the plug-in sleeve 51 of the flange housing or of the mating connector 50.

Thus, the latching hook pair in illustration A-A shows a latching hook 43 that is supported, over approximately a third of the sawtooth flank 55, below the latching groove 53', whereas in the illustration B-B, the latching hook 43 exactly or positively hooks into the latching groove 53', and in illustration C-C, the latching hook 43 rests, over approximately a third of the sawtooth flank 55, above the latching groove 53'.

With each further pushing on of the latching ring 40, respectively the plug-in connector 2, onto the mating connector 5, in each case one next latching hook pair completely locks into the following latching groove 53 and stays there until the next latching groove 53 is advanced by a further pushing in of the plug-in connector.

Thus, an axial dislocation with simultaneous latching of the plug-in connection may effected with a very fine gradation, which here amounts to approximately 0.5 mm and constitutes the effective latching distance ds.

This means that during the latching operation of the plug-in connector 2 or to the mating connector 5, the specified distance s of the latching grooves 53 is effectively reduced to a smaller latching distance ds. The distance ds results here from the latching groove distance ds divided by the number of different latching groove pairs.

In this way, in the case of optical plug-in connection, for example any possibly additional axial travel that results from component-related differences can be compensated, a difference that could otherwise only be realised by means of an additional compression spring.

In FIG. 4a, a plug-in connector 2 in a spatial part-section is shown, whereas FIG. 4b and FIG. 4c respectively show a detailed view of the latched sliding ring 30 or of the latched latch ring 40. What can be seen in FIG. 4a is the part-section in a spatial view, with only the sliding ring 30 and the latch ring 40 having been cut approximately in half. The connector body 40 and the O-ring 25 are shown uncut.

The latching of the sliding ring 30 on the latch ring 40 is shown in detail in FIG. 4b. In this figure, latching protrusions 32 on the sliding ring 30 can he seen, which latch behind the ring latching hooks 44 on the latch ring 40, As a result of this, the sliding ring 30 is retained on the latching ring 40 in a captive manner and can still be displaced for unlatching the plug-in connection 1 against the plug-in direction. Both the ring latching hooks 44 and the latching protrusions 32 are multiply distributed over the circumference of the latch ring 40.

In FIG. 4c, the latching of the latch ring 40 on the connector body 20 is shown in detail. Here, too, a plurality of latching means are spread over the circumference of the connector body 20. These means are formed by latching hooks 24, behind which the ring 41 of the latch ring 40 is latched and thus fixed.

LIST OF REFERENCE NUMERALS

1 Plug-in connection
2 Plug-in connector
3 External sleeve
4 Latching unit
5 Mating connector
20 Connector body in plug-in connector 2
21 Cable screw connection
22 Pressure screw
23 Sealing insert
24 Latching hook for 40
25 O-ring
26 Latching recess
30 Sliding ring =external sleeve 3
31 Ring latching on connector body
32 Latching protrusion for retaining 40
33 Opening hook
40 Latch ring=latching unit 4
41 Ring
42 Finger
43 Latching hook
44 Ring latching hooks for 30
45 Ring latching pair A-A, B-B, C-C
50 Flange housing=mating connector 5
51 Angled plug-in sleeve
52 Latching groove areas, offset against each other in a pairwise manner
53 Latching grooves
54 Plug-in edge on the plug-in sleeve
55 Sawtooth flank
d1,d2,d3 Distance of the latching groove areas 52 from the edge 54
s Latching groove distance
ds Effective latching distance

The invention claimed is:

1. A plug-in connection system for a two-piece plug-in connection (1), comprising a plug-in connector (2) and a mating connector (5), wherein said plug-in connector (2) includes an external sleeve (3) with a latching unit (4) provided therebetween, which is disposed on a connector body (20), wherein said plug-in connector (2) has on the plug-in side thereof a sliding mechanism for latching and unlatching with the mating connector (5), wherein the latching unit (4) comprises a ring (41) with a plurality of fingers (42) axially aligned thereon as a latching ring (40), which fingers have latching hooks (43) molded onto the ends thereof, wherein the external sleeve (3) as a sliding ring (30) is axially slidable on the connector body (20) over a certain amount of travel at a distance from the latching ring (40), wherein the mating connector (5) comprises a housing (50), the plug-in side of which is formed as a plug-in sleeve (51) with a plug-in edge (54), on the circumference of which a plurality of latching groove areas (52) are provided in a spaced-apart manner, wherein the latching groove areas (52) are formed from a plurality of latching grooves (53) spaced apart with a distance(s), characterised in that the latching groove areas (52) have different distances (d1, d2, d3) from the plug-in edge (54) of the plug-in sleeve (51), so that during the plug-in operation, the latching hooks (43) of the latching unit (4) engage one after the other in the latching grooves (53) provided at different distances, and that an effective latching distance (ds) is created for the plug-in connector (2) during the plug-in operation, which distance is smaller than the specified distance (s) of the latching grooves (53).

2. The plug-in connection system as claimed in claim 1, characterised in that the plug-In connection (1) can be unlatched again by means of the sliding ring (30), wherein as the plug-in connector (2) is being withdrawn, opening hooks (33) provided in the sliding ring (30) lift the latching hooks (43) out of the latching grooves (53) of the mating connector (5).

3. The plug-in connection system as claimed in claim 1, characterised in that the latching groove areas (52) are provided in a symmetric, circumferential and pairwise arrangement (A-A, B-B, C-C) on the plug-in sleeve (54) of the mating connector (5).

4. The plug-in connection system as claimed in claim 1, characterised in that the latching groove areas (52) on the mating connector (5) are respectively arranged in a pairwise manner on opposite surfaces and are identically aligned in relation to their distance from the plug-in edge (54) in a pairwise manner.

5. The plug-in connection system as claimed in claim 1, characterised in that the plug-in connector (2) and the mating connector (5) have an hexagonal shape, wherein three latching hook pairs (45) of the same type access the groove areas (52) on the mating connector (5).

* * * * *